(12) United States Patent
Nakagiri et al.

(10) Patent No.: US 8,631,720 B2
(45) Date of Patent: Jan. 21, 2014

(54) INDUSTRIAL ROBOT

(75) Inventors: Hiroshi Nakagiri, Osaka (JP); Sungjae Yoon, Osaka (JP); Makoto Kondo, Fujisawa (JP); Tatsuji Minato, Fujisawa (JP)

(73) Assignees: Daihen Corporation, Osaka-shi (JP); Kabushiki Kaisha Kobe Seiko Sho, Kobe-shi (JP)

( * ) Notice: Subject to any disclaimer, the term of this patent is extended or adjusted under 35 U.S.C. 154(b) by 199 days.

(21) Appl. No.: 13/074,527

(22) Filed: Mar. 29, 2011

(65) Prior Publication Data

US 2011/0252915 A1 Oct. 20, 2011

(30) Foreign Application Priority Data

Apr. 14, 2010 (JP) ................................. 2010-093152

(51) Int. Cl.
*B25J 17/00* (2006.01)
(52) U.S. Cl.
USPC ............................... 74/490.02; 901/8; 901/15
(58) Field of Classification Search
USPC ....................................................... 74/490.02
See application file for complete search history.

(56) References Cited

U.S. PATENT DOCUMENTS

| | | | | |
|---|---|---|---|---|
| 4,705,243 | A * | 11/1987 | Hartmann et al. | 248/51 |
| 4,937,759 | A * | 6/1990 | Vold | 700/262 |
| 4,973,215 | A * | 11/1990 | Karlen et al. | 414/729 |
| 4,975,856 | A * | 12/1990 | Vold et al. | 700/263 |
| 5,155,423 | A * | 10/1992 | Karlen et al. | 318/568.11 |
| 5,437,207 | A * | 8/1995 | Zimmer | 74/490.02 |
| 5,694,813 | A * | 12/1997 | McLaughlan | 74/490.02 |
| 6,325,749 | B1 * | 12/2001 | Inokuchi et al. | 483/13 |
| 7,202,442 | B2 * | 4/2007 | Nakagiri et al. | 219/137.9 |
| 7,322,258 | B2 * | 1/2008 | Shiraki et al. | 74/490.05 |
| 7,765,890 | B2 * | 8/2010 | Inoue et al. | 74/490.02 |
| 7,806,019 | B2 * | 10/2010 | Iwai et al. | 74/490.02 |
| D636,004 | S | 4/2011 | Nakagiri et al. | |
| D636,419 | S | 4/2011 | Nakagiri et al. | |
| D636,803 | S | 4/2011 | Nakagiri et al. | |
| 8,020,467 | B2 * | 9/2011 | Haniya et al. | 74/490.02 |
| 8,109,170 | B2 * | 2/2012 | Jinushi et al. | 74/490.01 |
| 2004/0261562 | A1 * | 12/2004 | Haniya et al. | 74/490.02 |
| 2005/0034552 | A1 * | 2/2005 | Back et al. | 74/490.02 |
| 2005/0103148 | A1 * | 5/2005 | Inoue et al. | 74/490.02 |

(Continued)

FOREIGN PATENT DOCUMENTS

| | | |
|---|---|---|
| CN | 101244564 | 8/2008 |
| CN | 201306553 | 9/2009 |

(Continued)

OTHER PUBLICATIONS

U.S. Appl. No. 13/085,890, filed Apr. 13, 2011, Nakagiri, et al.

(Continued)

*Primary Examiner* — David M Fenstermacher
*Assistant Examiner* — Zakaria Elahmadi
(74) *Attorney, Agent, or Firm* — Oblon, Spivak, McClelland, Maier & Neustadt, L.L.P.

(57) ABSTRACT

The present invention is characterized by arranging a flow path 200 for supplying driving gas to a tool mounting portion 170 from a robot base 110 to the tool mounting portion 170 through the interiors of a rotation frame 120, a tube 220, a shoulder 140, a swing arm 150 and a tool mounting rotation arm 160.

4 Claims, 9 Drawing Sheets

(56) References Cited

U.S. PATENT DOCUMENTS

| | | | |
|---|---|---|---|
| 2005/0193854 A1* | 9/2005 | Sanemasa | 74/490.02 |
| 2006/0101937 A1* | 5/2006 | Salomonsson et al. | 74/490.02 |
| 2008/0092689 A1* | 4/2008 | Shiraki et al. | 74/490.02 |
| 2008/0156137 A1* | 7/2008 | Larsson et al. | 74/490.02 |
| 2008/0229861 A1* | 9/2008 | Inoue et al. | 74/490.01 |
| 2008/0235970 A1* | 10/2008 | Crampton | 33/503 |
| 2008/0236324 A1* | 10/2008 | Inoue et al. | 74/490.02 |
| 2008/0264195 A1* | 10/2008 | Larsson et al. | 74/490.02 |
| 2009/0120228 A1* | 5/2009 | Larsson et al. | 74/490.02 |
| 2009/0314120 A1* | 12/2009 | Larsson | 74/490.02 |
| 2011/0203402 A1* | 8/2011 | Barkman et al. | 74/490.02 |
| 2011/0219906 A1* | 9/2011 | Haniya et al. | 74/490.03 |
| 2012/0067157 A1* | 3/2012 | Suzuki et al. | 74/490.02 |

FOREIGN PATENT DOCUMENTS

| | | |
|---|---|---|
| JP | 11-239992 | 9/1999 |
| KR | 10-2006-0015557 | 2/2006 |
| KR | 10-2007-0116031 | 12/2007 |

OTHER PUBLICATIONS

Office Action issued Jan. 22, 2013 in Korean Application No. 10-2011-0034356.

Office Action issued May 30, 2013, in Chinese Patent Application No. 201110096518.6.

\* cited by examiner

US 8,631,720 B2

INDUSTRIAL ROBOT

BACKGROUND OF THE INVENTION

1. Field of the Invention

The present invention relates to an industrial robot such as an articulated robot for performing an operation by a tool mounted to the tip of an arm.

2. Description of the Related Art

Generally, so-called articulated robots and other robots are widely used as industrial robots such as welding robots. An articulated robot includes a tool mounting portion, to which a tool is to be mounted, at a tip portion and the tool is detachable if necessary. Some of industrial robots of recent years are so constructed that one industrial robot successively performs various operations by itself by automatically exchanging a plurality of types of tools according to a program.

Such an industrial robot includes a locking mechanism for locking a tool and a tool mounting portion to reliably perform operations by preventing detachment of the tool from the tool mounting portion. The locking mechanism is driven, for example, by air supplied to the tool mounting portion to lock and unlock the tool and the tool mounting portion.

Conventionally, it has been a general practice to arrange a pipe for supplying air to a tool mounting portion outside an arm in an industrial robot, for example, as disclosed in JP-A-H11-239992 (hereinafter, referred to as patent literature 1). For example, for an industrial robot in which air is supplied to a working tool, there has been proposed a piping structure in which a pipe passed inside is taken out near a wrist portion and air is supplied to the wrist portion.

However, if the pipe is located at an outer side of the arm near the wrist portion in the industrial robot as disclosed in patent literature 1, the pipe may interfere with an external structure and may be broken in some cases. Further, the pipe may be entangled around an external structure and may become unable to supply air.

The industrial robot may be so constructed as to arrange the pipe in the arm, but the pipe may be twisted or buckled near a rotating shaft of the arm and a large space needs to be taken for a pipe path. However, if a large space is taken for the pipe path, an area around the rotating shaft of the arm becomes larger, thereby limiting application in a narrow place or the like.

SUMMARY OF THE INVENTION

In view of the above point, an object of the present invention is to provide an industrial robot which can prevent interference of a flow path for supplying gas to a tool mounting portion with an external structure.

In order to solve the above problem, the present invention is directed to an industrial robot, comprising a tool mounting portion to which a tool is to be mounted; a tool mounting rotation arm for rotatably and slidingly supporting the tool mounting portion; a swing arm for swingably supporting the tool mounting rotation arm via a swing shaft; a shoulder for rotatably supporting the swing arm via a swing arm rotating shaft; a lower arm for rotatably supporting the shoulder via an upper arm rotating shaft; a rotation frame for rotatably supporting the lower arm via a lower arm rotating shaft; a tube arranged along the lower arm from the rotation frame to the shoulder; and a robot base for rotatably supporting the rotation frame via a rotation frame rotating shaft; wherein a flow path for supplying driving gas to the tool mounting portion is arranged from the robot base to the tool mounting portion through the interiors of the rotation frame, the tube, the shoulder, the swing arm and the tool mounting rotation arm.

According to the industrial robot having the above construction, the gas supplied to the flow path is supplied from the robot base to the tool mounting portion through the interiors of the rotation frame, the tube, the shoulder, the swing arm and the tool mounting rotation arm without the flow path being exposed to the outside. Thus, interference of the flow path with an external structure such as a work can be prevented, wherefore adaptability to a narrow place or the like can be improved and the gas can be reliably supplied to the tool mounting portion.

These and other objects, features and advantages of the present invention will become apparent upon reading of the following detailed description along with the accompanying drawings.

BRIEF DESCRIPTION OF DRAWINGS

FIGS. 1A and 1B are diagrams showing one embodiment of an industrial robot according to the present invention, wherein FIG. 1A is a plan view partly in section diagrammatically showing a swing arm and a tool mounting rotation arm of the industrial robot and FIG. 1B is a side view partly in section diagrammatically showing the swing arm and the tool mounting rotation arm of the industrial robot.

DETAILED DESCRIPTION OF INVENTION

Figure 1A:
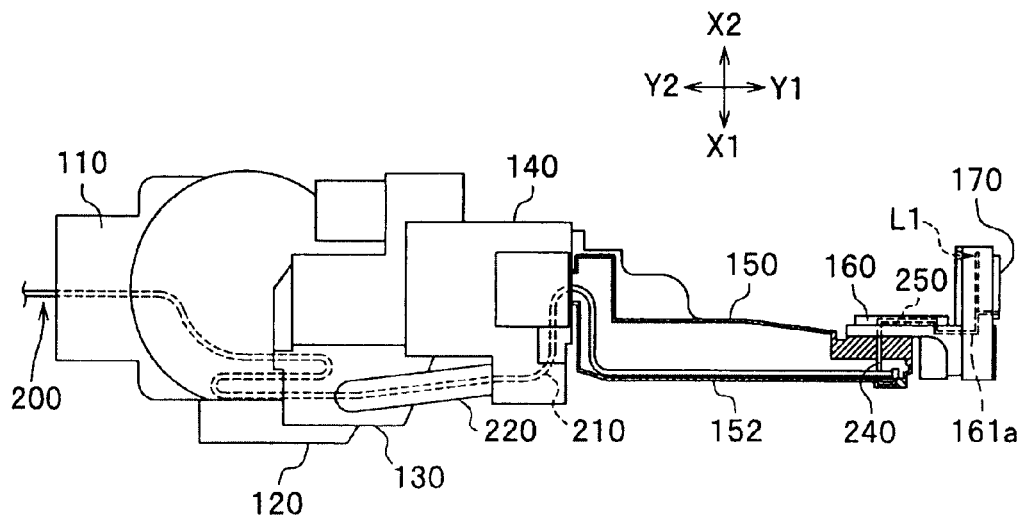

Hereinafter, an overall external construction of an industrial robot 10 according to the present invention is described with reference to FIGS. 7 and 8.

In the following description, terms "one end" and "other end" are used. "One end" basically means an upstream end in a structure extending from a robot base 110 (called an upstream side) of the industrial robot 100 to a tool 180 (called a downstream side) detachably mounted to a tool mounting portion 170 by way of a rotation frame 120, a lower arm 130, a shoulder 140, a swing arm 150 and a tool mounting rotation arm 160. "Other end" means a downstream end of a target constituent element.

Figure 7:
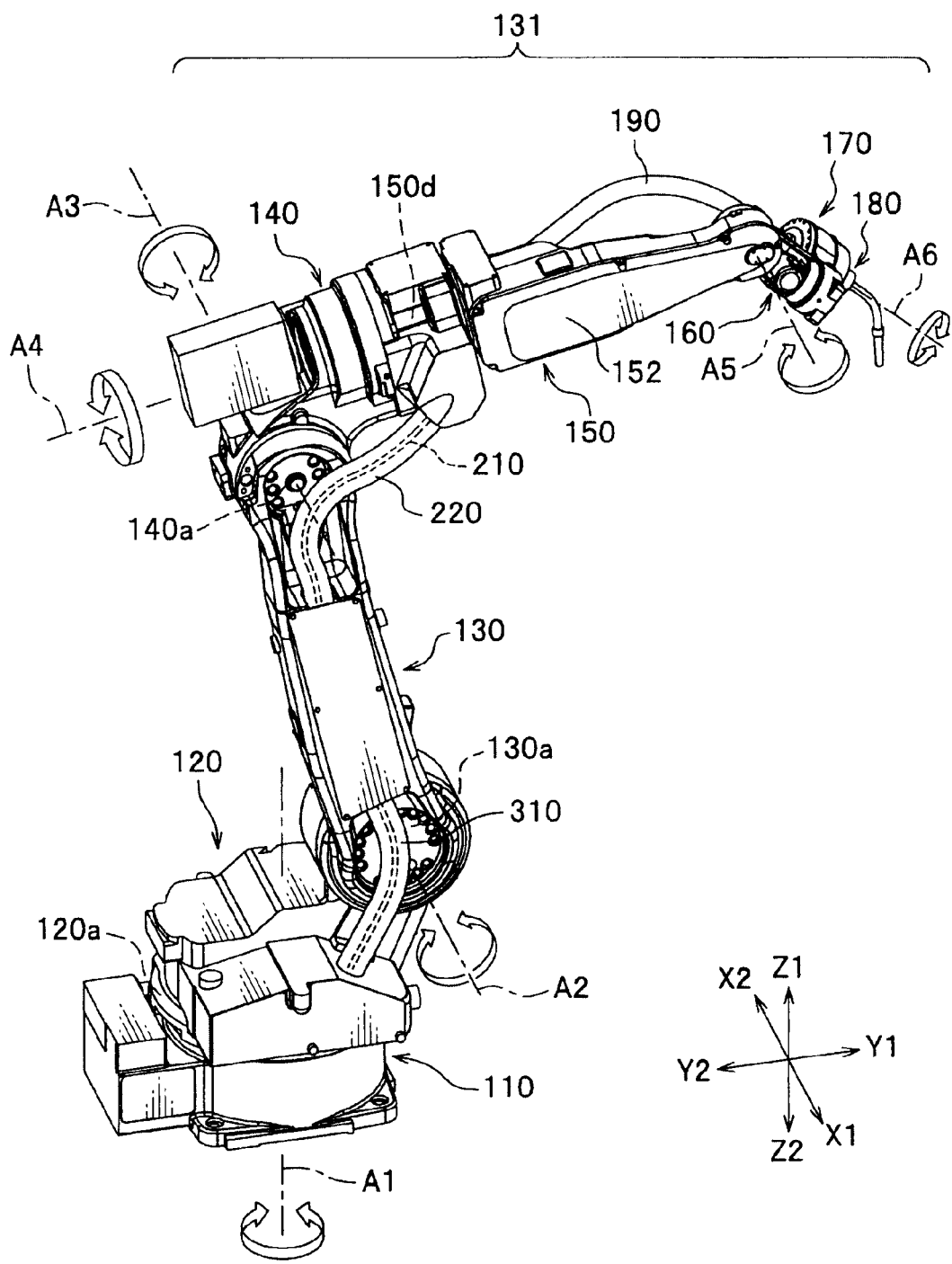
FIG. 7 is a perspective view of the embodiment of the industrial robot according to the present invention.
Figure 8:
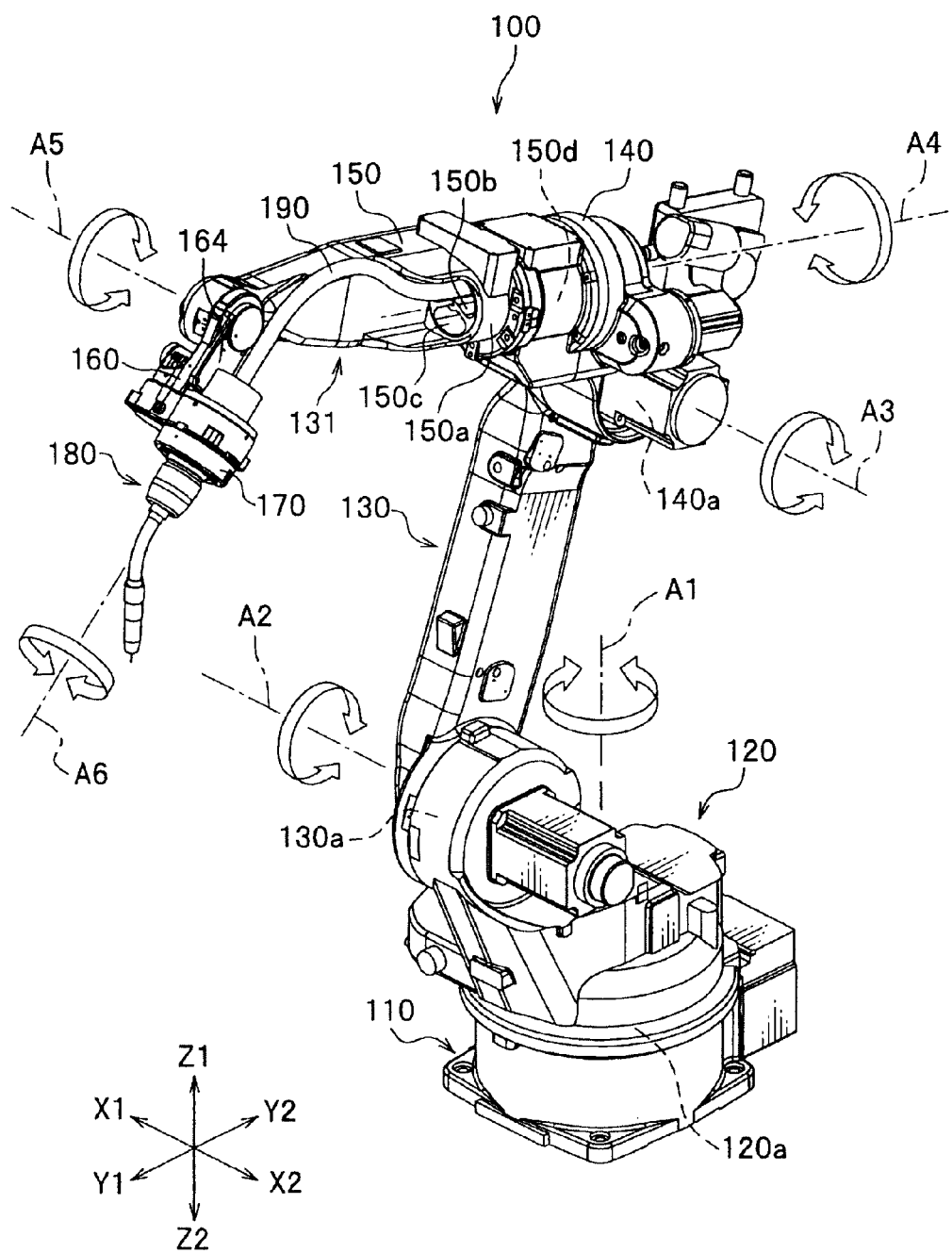
FIG. 8 is a perspective view of the embodiment of the industrial robot according to the present invention.

The industrial robot 100 of this embodiment is a so-called six-axis articulated welding robot and includes the robot base 110 fixed to a mounting surface, the rotation arm 120 which rotates about a first axis A1 on the robot base 110, the lower arm 130 which is connected to the rotation arm 120 and rotates about a second axis A2, and an upper arm 131 which is connected to the lower arm 130 and rotates about a third axis A3 as shown in FIGS. 7 and 8.

The robot base 110 is fixed, for example, to a predetermined mounting surface such as a floor surface of a work site. The rotation frame 120 is rotatably supported on the robot base 110 via a rotation frame rotating shaft 120a and mounted to be driven and rotated about the first axis A1. The first axis A1 is an axis extending in a direction orthogonal to the mounting surface. The rotation frame 120 is so mounted on the robot base 110 that the lower arm 130 can be driven and rotated about the second axis A2.

The lower arm 130 has one end rotatably supported on the rotation frame 120 via a lower arm rotating shaft 130a and mounted to be driven and rotated about the second axis A2. The second axis A2 is an axis extending in a direction orthogonal to the first axis A1 and parallel to the mounting surface. The upper arm 131 is mounted to the lower arm 130 to be driven and rotated about the third axis A3.

The upper arm 131 includes the shoulder 140 which rotates about the third axis A3, the swing arm (five-axis arm) 150 which is connected to the shoulder 140 and rotates about a fourth axis A4, the tool mounting rotation arm (end arm) 160 which is connected to the swing arm 150 and rotates about a fifth axis A5 and the tool mounting portion 170 which is mounted to the tool mounting rotation arm 160 and rotates about a sixth axis A6.

The shoulder 140 is rotatably supported on the other end of the lower arm 130 via an upper arm rotating shaft 140a and mounted to be driven and rotated about the third axis A3. The third axis A3 is an axis about which the swing arm 150 is vertically driven and which extends in a direction parallel to the second axis A2. One end of the swing arm 150 is mounted to this shoulder 140 in a direction orthogonal to the third axis A3.

The swing arm 150 is rotatably supported on the shoulder 140 via a swing arm rotating shaft 150d and mounted to be driven and rotated about the fourth axis A4. The fourth axis A4 is an axis extending in a direction orthogonal to the third axis A3.

The tool mounting rotation arm 160 has one end mounted to the other end of the swing arm 150 to be driven and rotated about the fifth axis A5. The fifth axis A5 is an axis extending in a direction parallel to the third axis A3 and orthogonal to the fourth axis A4.

Figure 9:
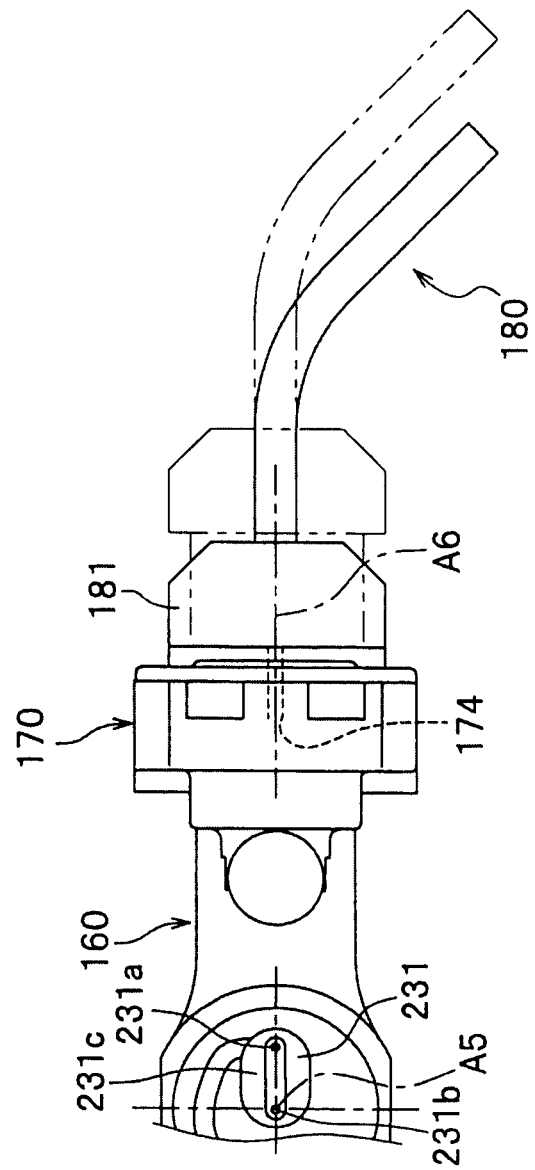
FIG. 9 is a side view of an area around the tool mounting portion of the embodiment of the industrial robot according to the present invention.

The tool mounting portion 170 has a substantially cylindrical shape and is mounted to the other end of the tool mounting rotation arm 160 to be driven and rotated about the sixth axis A6, and the tool 180 is mounted thereto. The sixth axis A6 is an axis orthogonal to the fifth axis A5 and crosses the fourth axis A4 on the fifth axis A5, and the tool mounting portion 170 is rotated about this axis. The tool 180 is inserted into an inner peripheral side of the tool mounting portion 170 to be mounted to the tool mounting portion 170. As shown in FIG. 9, the tool 180 is locked in the tool mounting portion 170 by a locking mechanism 181.

The tool 180 is, for example, a welding tool and connected to a cable 190 at a side of the tool mounting portion 170 toward the swing arm 150. As shown in FIG. 8, the swing arm 150 is formed with a cable through hole 150a on the fourth axis A4. The cable through hole 150a includes through holes 150b, 150c penetrating in a direction of the fourth axis A4, and the cable 190 is connected to the tool 180 through the through hole 150b.

A tube 220 is made of a flexible tube or a spring having an inner diameter larger than an introduction pipe 210, arranged on a side surface of the lower arm 130 along an extending direction of the lower arm 130 up to a lower part of the shoulder 140, and connected with the lower part of the shoulder 140. This tube 220 may be arranged with a power cable or the like other than the introduction pipe 210 inserted therein.

Next, an arrangement of a flow path 200 for supplying air to the tool mounting portion 170 of the industrial robot 100 according to the present invention is described with reference to FIGS. 1 to 4.

The flow path 200 for supplying air to the tool mounting portion 170 of this embodiment to control the locking mechanism includes the instruction pipe 210 arranged in the robot base 110, the rotation frame 120, the tube 220, the shoulder 140 and the swing arm 150 shown in FIG. 1, an inner shaft pipe 240 having one end connected to the introduction pipe 210 and arranged on the fifth axis A5 in the swing arm 150, and a tool mounting rotation arm inner pipe 250 having one end connected to the other end of the inner shaft pipe 240. The flow path 200 further includes, shown in FIGS. 3 and 4, a tool mounting rotation arm inner flow path 161a having one end connected to the other end of the tool mounting rotation arm inner pipe 250, a tool mounting/rotating portion side groove portion 162a formed in a sliding surface of a tool mounting/rotating portion 162 against the tool mounting portion 170 over the entire inner periphery on a circumference centered on the sixth axis A6, a tool mounting portion side groove portion 172 connected to the other end of the tool mounting rotation arm inner flow path 161a and formed in a sliding surface of the tool mounting portion 170 against the tool mounting rotation arm 160 on a circumference centered on the sixth axis A6, a tool mounting portion inner flow path 173 formed from the tool mounting portion side groove portion 172 toward the sixth axis A6 as a center of rotation of the tool mounting portion 170, and a connection path 174 which allows the other end of the tool mounting portion inner flow path 173 to communicate with an leading end surface of the tool mounting portion 170.

This flow path 200 is so formed as not be exposed to the outside of the industrial robot 100.

The introduction pipe 210 is formed, for example, by combining a flexible tube, a steel pipe, a joint and the like and, as shown in FIG. 1A, inserted into the robot base 110 from a rear surface of the robot base 110, more specifically from a side surface at a side indicated by arrow Y2 when the industrial robot 100 is in a posture shown in FIGS. 7 and 8. The introduction pipe 210 drawn into the robot base 110 is bent upward, i.e. in a direction indicated by arrow Z1 in the robot base 110 and inserted into the rotation frame 120 from the robot base 110.

The introduction pipe 210 is arranged in a zigzag manner so as not to be twisted in the rotation frame 120 by the rotation of the rotation frame 120 and so as to ensure a length capable of dealing with the rotation of the rotation frame 120. The introduction pipe 210 is inserted into the tube 220 extending upward from an upper surface of the rotation frame 120 at a side indicated by arrow X1 in FIGS. 7 and 8 when the industrial robot 100 is in the posture shown in FIGS. 7 and 8.

Figure 1B:
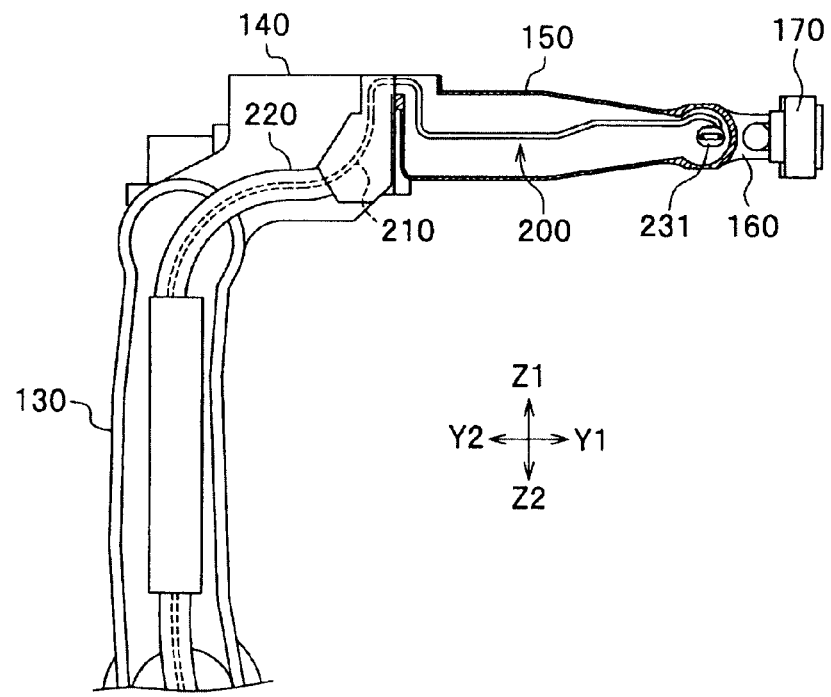
Figure 2:
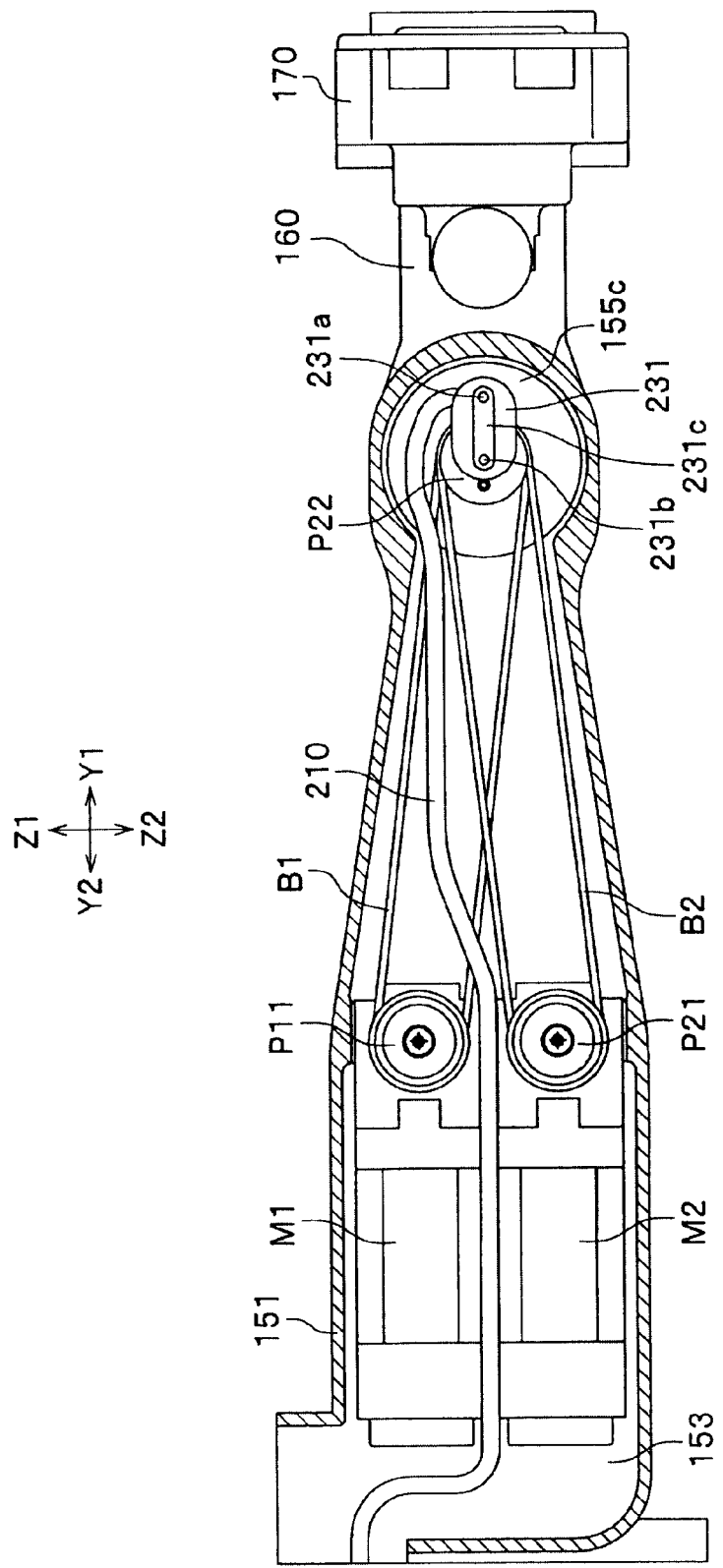
FIG. 2 is a side view of the embodiment of the industrial robot according to the present invention when a cover is removed.

The introduction pipe 210 is further inserted into the shoulder 140 through the tube 220 from the interior of the rotation frame 120 and arranged from the rotation frame 120 to the shoulder 140 without being exposed to the outside. As shown in FIGS. 1A and 1B, the introduction pipe 210 is arranged toward a connected part of the shoulder 140 and the swing arm 150 in the shoulder 140 and inserted into the swing arm 150 in this connected part.

Figure 3:
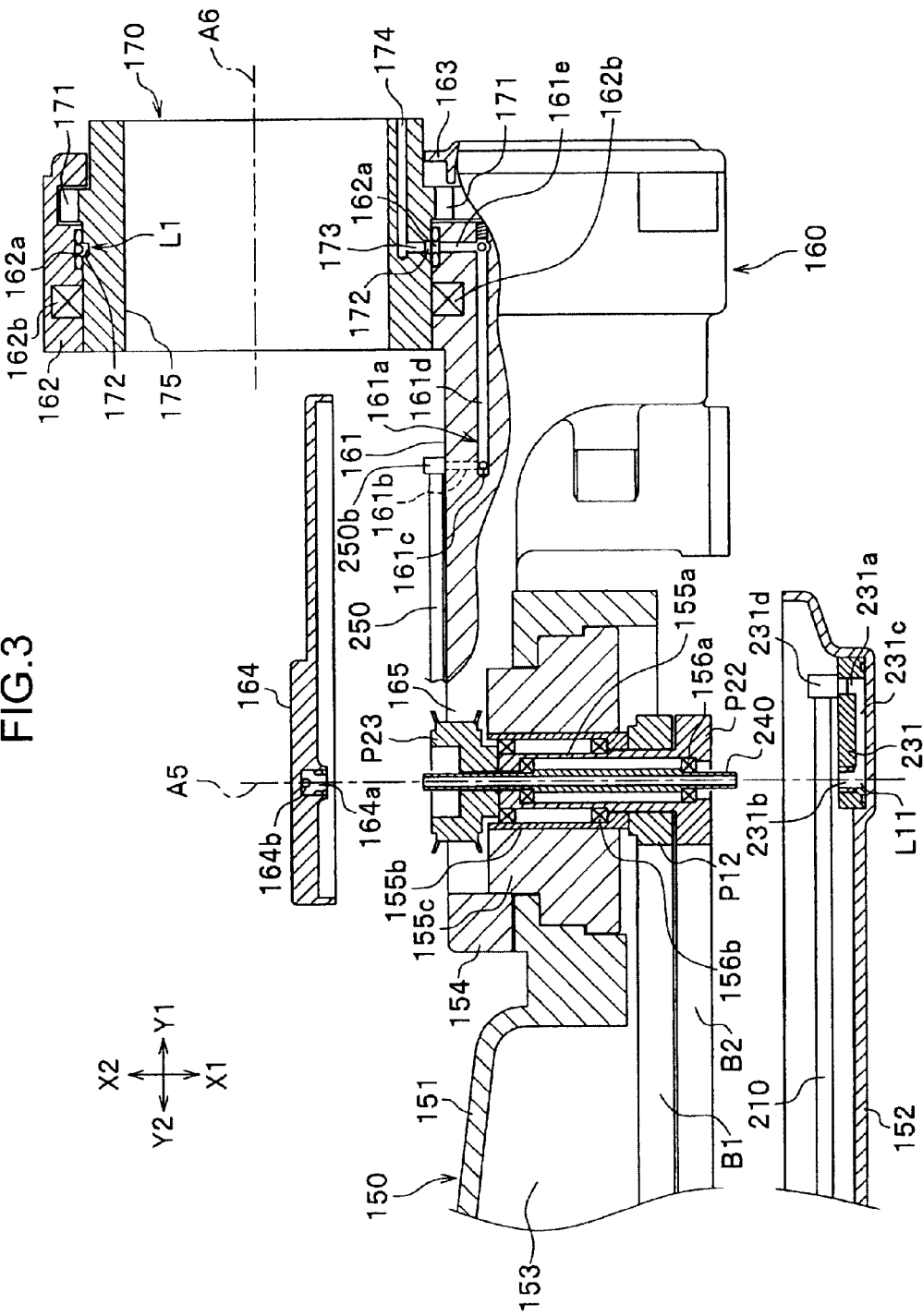
FIG. 3 is a plan view in section of the embodiment of the industrial robot according to the present invention when the cover is removed.
Figure 4:
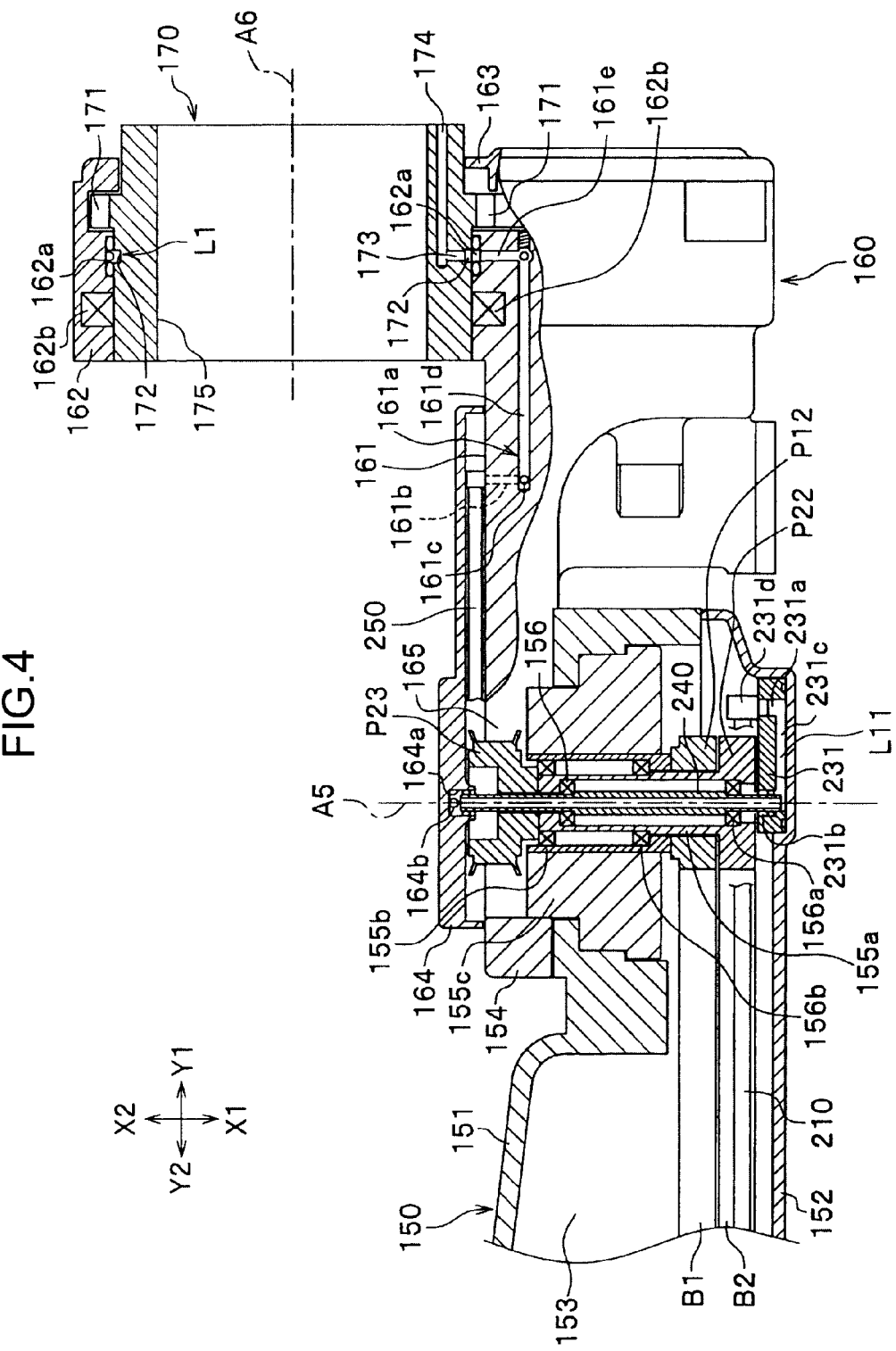
FIG. 4 is a plan view in section of the embodiment of the industrial robot according to the present invention in an assembled state.

As shown in FIGS. 3 and 4, the swing arm 150 includes a swing arm main body 151 and a swing arm cover 152. A side surface of the swing arm main body 151 at a side indicated by the arrow X1 is open when the industrial robot 100 is in a posture shown in FIGS. 6 and 7. An opening of the swing arm main body 151 is covered by the swing arm cover 152, and a housing portion 153 is formed by the swing arm main body 151 and the swing arm cover 152.

The introduction pipe 210 is inserted between a tool mounting rotation arm driving motor M1, a tool mounting rotation arm driving input pulley P11, a tool mounting rotation arm driving belt B1, a tool mounting rotation arm driving output pulley P12 and a tool mounting portion driving motor M2, a tool mounting portion driving input pulley P21, a tool mounting portion driving belt B2, a tool mounting portion driving output pulley P22, and arranged up to the vicinity of the fifth axis A5 along the inner surface of the swing arm cover 152 in the housing portion 153. As shown in FIGS. 3 and 4, the other end of the introduction pipe 210 is connected to a connecting member 231 mounted near the fifth axis A5 on the inner surface of the swing arm cover 152 in a part near the fifth axis A5.

The connecting member 231 includes an inlet port 231a, a swing arm cover bearing portion 231b and a groove portion 231c and is mounted at a predetermined position on the inner side of the swing arm cover 152 surrounding a position on an axis line corresponding to the fifth axis A5 as shown in FIGS. 3 and 4. The inlet port 231a is a communication hole formed in a thickness direction of the connecting member 231 and enables connection of the introduction pipe 210 via a connection joint 231d from a side of the swing arm main body 151 toward the swing arm cover 152.

The inlet port 231a is formed to communicate with the groove portion 231c formed in a surface of the connecting member 231 facing the swing arm cover 152. Further, the inlet port 231a is arranged at a position displaced in a direction Y1 (leading end direction) from a position on the axis line corresponding to the fifth axis A5 with the connecting member 231 mounted in the swing arm cover 152.

The groove portion 231c is formed from the inlet port 231a in a direction toward the fifth axis A5. Further, the groove portion 231c is also formed to face the inner surface of the swing arm cover 152 and closed by the inner surface of the swing arm cover 152 to form a swing arm cover flow path L11.

The swing arm cover bearing portion 231b is formed at a position of the connecting member 231 coinciding with the fifth axis A5 to communicate with the groove portion 231c.

The one end of the inner shaft pipe 240 to be described later is inserted into this swing arm cover bearing portion 231b to be rotatably supported. A sealing member is provided to prevent air leakage between the inner shaft pipe 240 and the swing arm cover bearing portion 231b. The inner shaft pipe 240 is, for example, made of a steel pipe or a tube and fixed on the fifth axis A5. Note that the inner shaft pipe 240 is not limited to a steel pipe and may be any straight pipe.

On the outer periphery of this inner shaft pipe 240, an intermediate power transmission shaft 155a is provided rotatably with respect to the inner shaft pipe 240 via an inner shaft pipe bearing portion 156a. The inner shaft pipe bearing portion 156a rotatably holds the inner shaft pipe 240 with respect to the intermediate power transmission shaft 155a.

The intermediate power transmission shaft 155a has the tool mounting portion driving output pulley P22 provided on one end thereof, and drive power from the tool mounting portion driving motor M2 for rotating the tool mounting portion 170 is transmitted to the tool mounting portion driving output pulley P22 via the tool mounting portion driving input pulley P21 and the tool mounting portion driving belt B2 in the housing portion 153, thereby transmitting this rotational drive force to the tool mounting rotation arm 160.

On the outer periphery of this intermediate power transmission shaft 155a, a swing shaft 155b is rotatably provided via an intermediate power transmission shaft bearing portion 156b. The intermediate power transmission shaft bearing portion 156b holds the intermediate power transmission shaft 155a rotatably with respect to the swing shaft 155b. The swing shaft 155b has the tool mounting rotation arm driving output pulley P12 provided on one end thereof, and a rotational drive force from the tool mounting rotation arm driving motor M1 for swinging the tool mounting rotation arm 160 is transmitted to the tool mounting rotation arm driving output pulley P12 via the tool mounting rotation arm driving input pulley P11 and the tool mounting rotation arm driving belt B1 in the housing portion 153, whereby the output pulley P12 is driven and rotated by this rotational drive force supplied from the tool mounting rotation arm driving motor M1.

A tool mounting rotation arm driving speed reducing mechanism 155c is engaged with the outer periphery of the swing shaft 155b. This tool mounting rotation arm driving speed reducing mechanism 155c is engaged with the swing shaft 155b and the tool mounting rotation arm 160 to swing the tool mounting rotation arm 160 with the rotation of the swing shaft 155b slowed. Note that the tool mounting rotation arm driving speed reducing mechanism 155c is, for example, a wave gear device (so-called harmonic speed reducer) and not limited in its construction provided that it can transmit a force while reducing the speed of the force.

The other end of the inner shaft pipe 240 is connected to the tool mounting rotation arm 160. The tool mounting rotation arm 160 includes a tool mounting rotation arm main body 161, the tool mounting/rotating portion 162, a tool mounting rotation arm tip cover 163 and a tool mounting rotation arm cover 164. The tool mounting rotation arm main body 161 is formed with a housing portion 165 which is open in a direction indicated by arrow X2 when the industrial robot 100 is in the posture shown in FIGS. 7 and 8.

The housing portion 165 is provided around the fifth axis A5 and a transmission mechanism for transmitting the rotational drive force to the tool mounting portion 170 is housed therein. An opening of the tool mounting rotation arm main body 161 is covered by the tool mounting rotation arm cover 164.

The tool mounting rotation arm cover 164 is formed with a tool mounting rotation arm cover bearing portion 164a and a tool mounting rotation arm cover flow path 164b.

The tool mounting rotation arm cover bearing portion 164a is formed on the fifth axis A5 on the underside of the tool mounting rotation arm cover 164 and rotatably supports the other end of the inner shaft pipe 240.

Figure 5:
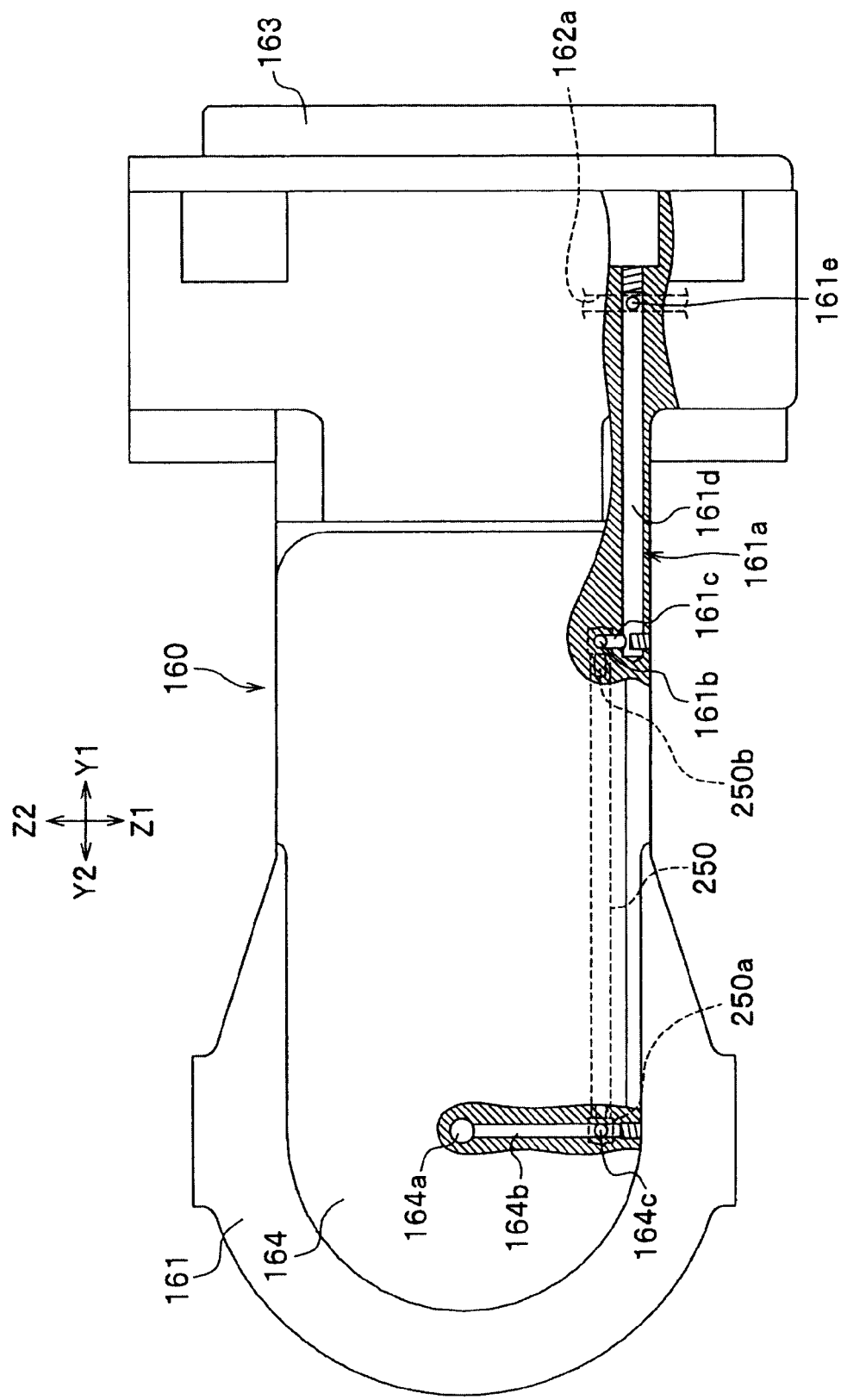
FIG. 5 is a sectional view of an area around a tool mounting rotation arm cover of the embodiment of the industrial robot according to the present invention.

As shown in FIG. 5, the tool mounting rotation arm cover bearing portion 164a is formed to communicate with one end of the tool mounting rotation arm cover flow path 164b formed in the tool mounting rotation arm cover 164. The tool mounting rotation arm cover flow path 164b is formed to extend upward, i.e. in a direction indicated by arrow Z1 when the industrial robot 100 is in a posture shown in FIG. 1B, in the tool mounting rotation arm cover 164 from a side surface of the tool mounting rotation arm cover bearing portion 164a.

The other end of the tool mounting rotation arm cover flow path 164b is connected to a connection port 164c formed to extend toward the inner surface of the tool mounting rotation arm cover 164 near the upper edge of the tool mounting rotation arm cover 164.

One end of the tool mounting rotation arm inner pipe 250 is connected to the connection port 164c via a connection joint 250a. The tool mounting rotation arm inner pipe 250 extends toward the leading end in the tool mounting rotation arm 160. The other end of the tool mounting rotation arm inner pipe 250 is connected to the tool mounting rotation arm inner flow path 161a formed in the tool mounting rotation arm main body 161 via a connection joint 250b. The tool mounting rotation arm inner flow path 161a includes an inlet port formed as a recess in the front surface of the tool mounting rotation arm main body 161 from the inner surface of the housing portion 165, a communicating portion 161b connected to this inlet port and formed to extend in a direction indicated by arrow X1 in FIG. 4 in the tool mounting rotation arm main body 161, a communicating portion 161d connected to the communicating portion 161b via a communicating portion 161c and formed to extend in the leading end direction, i.e. in a direction indicated by arrow Y1 in FIG. 4 in the tool mounting rotation arm main body 161, and a communicating portion 161e connected to the communicating portion 161d and formed to extend in a direction indicated by arrow X2 in FIG. 4 in a part adjacent to the tool mounting/rotating portion 162.

The tool mounting rotation arm inner pipe 250 is connected to one end of the inlet port via the connection joint 250b. The communicating portion 161c is formed to communicate with the other end of the inlet port 161b. The communicating portion 161c crosses the inlet port at a right angle and extends in a direction indicated by arrow Z1 in FIG. 5, and one end thereof communicates with the inlet port and the other end thereof communicates with the communicating portion 161d.

The communicating portion 161d is formed in the tool mounting/rotating portion side groove portion 162a extending in a direction indicated by Y1 in FIG. 5, and the other end is connected to communicate with the communicating portion 161e. The communicating portion 161e is formed to extend in the direction indicated by X2 in FIG. 4, and the other end is open in the sliding surface of the tool mounting/rotating portion 162 against the tool mounting portion 170.

Figure 6:
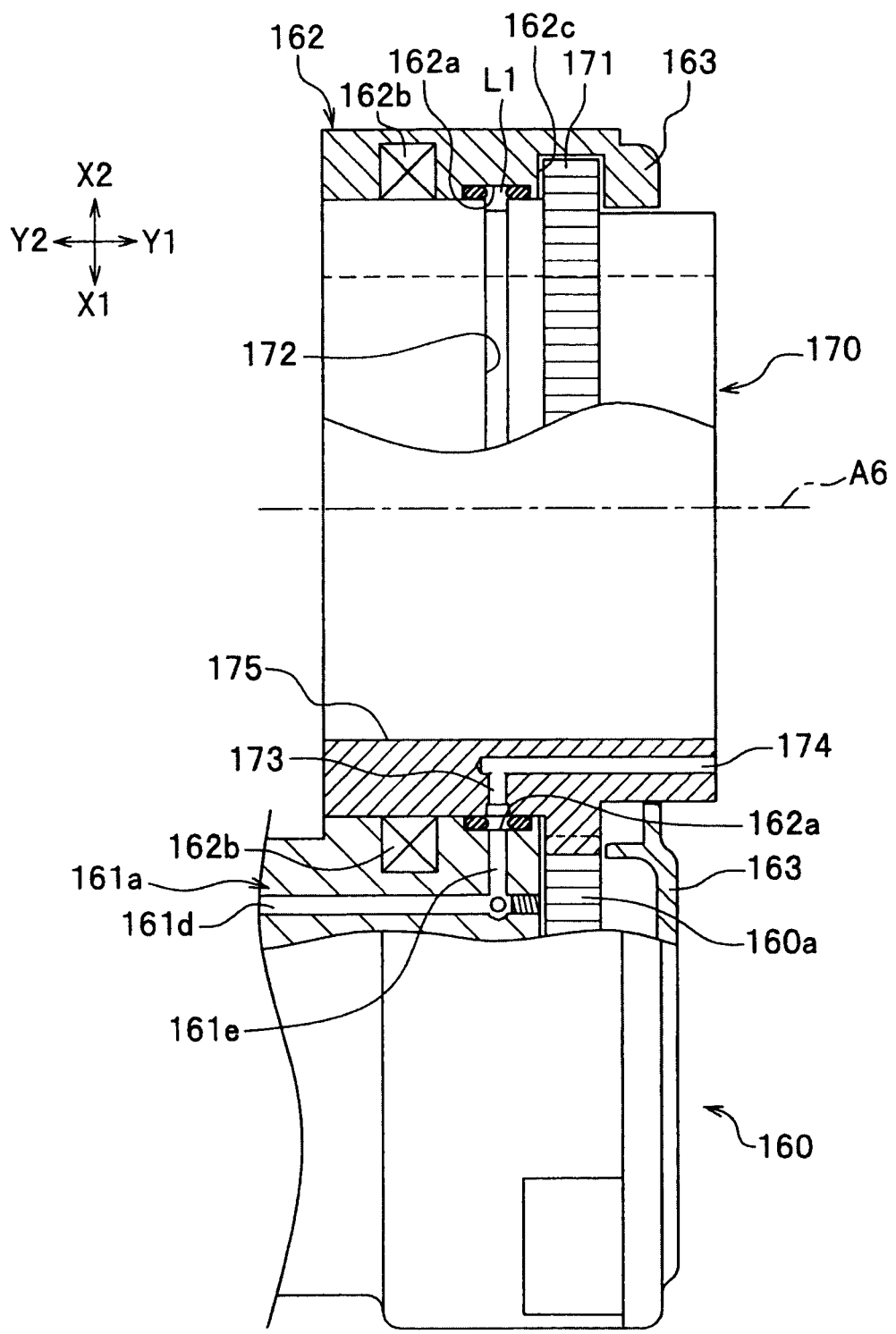
FIG. 6 is a sectional view of a tool mounting portion of the embodiment of the industrial robot according to the present invention.

The tool mounting/rotating portion 162 has a cylindrical shape centered on the sixth axis A6 and projects in the direction indicated by arrow X2 in FIGS. 4 and 6 from a leading end portion of the tool mounting rotation arm main body 161.

As shown in FIG. 6, in an inner peripheral portion of this tool mounting/rotating portion 162, the tool mounting/rotating portion side groove portion 162a is formed on an entire circumference centered on the sixth axis A6. The other end of the communicating portion 161e is formed to communicate with this tool mounting/rotating portion side groove portion 162a. The tool mounting/rotating portion side groove portion 162a and the tool mounting portion side groove portion 172 face each other at the sliding surfaces to form a rotational flow path L1.

The tool mounting portion 170 is so mounted via a bearing 162b that the outer peripheral surface thereof slides on the inner peripheral surface of this tool mounting/rotating portion 162 and an end surface of an outer gear 171 toward the swing arm 150 faces a stepped portion 162c of the tool mounting/rotating portion 162. The tool mounting portion 170 is so mounted at an inner peripheral side of the tool mounting/rotating portion 162 via the bearing 162b and the like that the end surface of the gear 171 toward the swing arm 150, i.e. the end surface at the side indicated by Y2 is engaged with the stepped portion 162c of the tool mounting/rotating portion 162.

The tool mounting portion 170 is mounted into the tool mounting/rotating portion 162 to engage the outer gear 171 with an output gear 160a. The output gear 160a rotates about an axis of rotation parallel to the sixth axis A6 to rotate the tool mounting portion 170.

The tool mounting rotation arm tip cover 163 is mounted on the leading end, i.e. side indicated by arrow Y1 in FIGS. 3 and 4, of the tool mounting/rotating portion 162. The tool mounting rotation arm tip cover 163 covers an open surface of the tool mounting rotation arm main body 161 at the side indicated by arrow Y1 in FIG. 4, covers the inner peripheral side of the tool mounting/rotating portion 162 and is engaged with the upper surface of the outer gear 171 of the tool mounting portion 170 to rotatably hold the tool mounting portion 170 in the tool mounting/rotating portion 162.

The tool mounting portion side groove portion 172 of the tool mounting portion 170 and the tool mounting/rotating portion side groove portion 162a of the tool mounting/rotating portion 160 are formed on the circumference while facing each other, and form the rotational flow path L1. The tool mounting portion inner flow path 173 perforated in a direction toward the sixth axis A6 is formed in the bottom surface of the tool mounting portion side groove portion 172 of the tool mounting portion 170 that forms this rotational flow path L1. This tool mounting portion inner flow path 173 is a recessed hole formed in the bottom surface of the tool mounting portion side groove portion 172 of the tool mounting portion 170.

The connection path 174 is formed to extend from the bottom surface of the tool mounting portion inner flow path 173 toward the leading end of the tool mounting portion 170, i.e. toward the end surface at the side indicated by arrow Y1 in FIGS. 3 and 4. The other end of this connection path 174 is exposed to the outside at the end surface of the tool mounting portion 170 and connected to the locking mechanism 181 of the tool 180 to which air is supplied. The locking mechanism 181 of the tool 180 is operated by air supplied from the connection path 174.

Such a connecting mechanism for gas between the tool mounting rotation arm 160 and the tool mounting portion 170 is called an air rotary joint structure.

The connection path 174 is formed at a position to face an air inlet port of the locking mechanism 181 and the like shown in FIG. 9 when the tool 180 is mounted to the tool mounting portion 170.

Next, an air flow when air is supplied to the tool mounting portion 170 is described with reference to FIGS. 1 and 3.

Air is supplied to the inlet port 231a of the swing arm cover 152 in the swing arm 150 through the introduction pipe 210 passing through the robot base 110, the rotation frame 120, the tube 220 and the shoulder 140.

Although the rotation frame 120 rotates about the first axis A1, the introduction pipe 210 is neither twisted or entangled even if the rotation frame 120 rotates on the robot base 110 since a space can be taken around the introduction pipe 210 in the rotation frame 120. Since the introduction pipe 210 is introduced into the shoulder 140 through the tube 220 from the rotation frame 120 without passing through the interior of the lower arm rotating shaft 130a, a space can be taken around the introduction pipe 210. Thus, the introduction pipe 210 is neither twisted nor entangled even if the lower arm 130 is rotated by the lower rotating shaft 130a.

Further, since not passing through the interior of the upper arm rotating shaft 140a for rotating the shoulder 140, the introduction pipe 210 will be neither twisted nor entangled. Even if the swing arm 150 is rotated by the swing arm rotating shaft 150d, the introduction pipe 210 is neither twisted nor entangled since a space can be taken around the introduction pipe 210 around the swing arm rotating shaft 150d.

Air supplied to the inlet port 231*a* (FIGS. 3, 4) from the introduction pipe 210 is supplied to the swing arm cover bearing portion 231*b* through the groove portion 231*c* of the connecting member 231 mounted in the swing arm cover 152. The air supplied to the swing arm cover bearing portion 231*b* is supplied to the one end of the inner shaft pipe 240 inserted into the swing arm cover bearing portion 231*b* and sent out from the other end of the inner shaft pipe 240.

The air sent out from the other end of the inner shaft pipe 240 is supplied to the tool mounting rotation arm cover bearing portion 164*a* of the tool mounting rotation arm cover 164 provided on the fifth axis A5 and further supplied to the tool mounting rotation arm inner pipe 250 through the tool mounting rotation arm cover flow path 164*b* (FIG. 5) communicating with the tool mounting rotation arm cover bearing portion 164*a*. The air supplied to the tool mounting rotation arm inner pipe 250 is supplied to the other end of the tool mounting rotation arm inner pipe 250 through the tool mounting rotation arm inner pipe 250.

At this time, even if the intermediate power transmission shaft 115*a* and the swing shaft 155*b* rotate, the inner shaft pipe 240 is not affected by the rotation of the intermediate power transmission shaft 115*a* and the swing shaft 155*b* and, hence, neither twisted nor entangled since being rotatably mounted in the intermediate power transmission shaft 155*a* via the inner shaft pipe bearing portion 156*a*.

The air supplied to the other end of the tool mounting rotation arm inner pipe 250 is supplied to the one end of the tool mounting rotation arm inner flow path 161*a* provided in the tool mounting rotation arm main body 161 of the tool mounting rotation arm 160.

The air supplied to the tool mounting rotation arm inner flow path 161*a* is supplied to the rotational flow path L1 formed by the tool mounting/rotating portion side groove portion 162*a* formed in the inner periphery of the tool mounting/rotating portion 162 of the tool mounting rotation arm 160 and the terminal mounting portion side groove portion 172 formed in the outer periphery of the terminal mounting portion 170. The air supplied to the rotational flow path L1 is supplied to the one end of the terminal mounting portion inner flow path 173 communicating with the terminal mounting portion side groove portion 172 of the terminal mounting portion 170.

The air supplied to the one end of the terminal mounting portion inner flow path 173 is sent out from the other end of the terminal mounting portion inner flow path 173 to be supplied to the locking mechanism (FIG. 9) of the tool 180 through the connection path 174.

At this time, even if the terminal mounting portion 170 rotates, the air is supplied to the connection path 174 of the terminal mounting portion 170 from the tool mounting rotation arm 160 through the rotational flow path L1 formed in the sliding surfaces of the tool mounting rotation arm 160 and the terminal mounting portion 170.

As shown in FIG. 9, the air sent out from the connection path 174 is supplied to the locking mechanism 181 of the tool 180, thereby driving the locking mechanism 181 and functioning as a drive force, for example, to unlock the tool 180 and the terminal mounting portion 170. By unlocking, the tool 180 can be detached from the terminal mounting portion 170 as shown by broken line in FIG. 9.

According to this embodiment, since the air supply pipe for supplying air from the robot base 110 to the terminal mounting portion 170 is not exposed to the outside of the robot body as shown in FIGS. 1, 7 and 8, interference thereof with the industrial robot 100 and surrounding external structures can be prevented. Therefore, air can be stably supplied to the terminal mounting portion 170.

Further, air is supplied from the interior of the tool mounting rotation arm 160 to the terminal mounting portion 170 through the rotational flow path L1 formed in the sliding surfaces of the tool mounting rotation arm 160 and the terminal mounting portion 170 on the circumference centered on the sixth axis A6. Thus, air can be stably supplied to the terminal mounting portion 170 without the pipe being twisted or entangled.

According to this embodiment, by making the inner shaft pipe 240 arranged on the fifth axis A5 of a steel pipe, twisting of the inner shaft pipe 240 on the fifth axis A5 caused by the rotation of the tool mounting rotation arm 160 can be prevented.

Further, according to this embodiment, by inserting the inner shaft pipe 240 into the swing arm cover 152 and the tool mounting rotation arm cover 164 to supply air from the swing arm 150 to the tool mounting rotation arm 160, a width in a direction of the swing shaft can be reduced, with the result that adaptability to a narrow place can be improved. According to this embodiment, by being rotatably held by the bearing portion, the inner shaft pipe 240 can be reliably arranged on the fifth axis A5 and reproducibility of the mount position of the inner shaft pipe 240 is improved.

Thus, assemblability of the inner shaft pipe 240 can be improved and maintainability of an air pipe can be improved.

In summary, an industrial robot according to the present invention includes a tool mounting portion to which a tool is to be mounted; a tool mounting rotation arm for rotatably and slidably supporting the tool mounting portion; a swing arm for swingably supporting the tool mounting rotation arm via a swing shaft; a shoulder for rotatably supporting the swing arm via a swing arm rotating shaft; a lower arm for rotatably supporting the shoulder via an upper arm rotating shaft; a rotation frame for rotatably supporting the lower arm via a lower arm rotating shaft; a tube arranged along the lower arm from the rotation frame to the shoulder; and a robot base for rotatably supporting the rotation frame via a rotation frame rotating shaft; wherein a flow path for supplying driving gas to the tool mounting portion is arranged from the robot base to the tool mounting portion through the interiors of the rotation frame, the tube, the shoulder, the swing arm and the tool mounting rotation arm.

According to the industrial robot having the above construction, the gas supplied to the flow path is supplied from the robot base to the tool mounting portion through the interiors of the rotation frame, the tube, the shoulder, the swing arm and the tool mounting rotation arm without the flow path being exposed to the outside. Thus, interference of the flow path with an external structure such as a work can be prevented, wherefore adaptability to a narrow place or the like can be improved and the gas can be reliably supplied to the tool mounting portion.

In the industrial robot of the present invention, the flow path may include a rotational flow path formed along sliding surfaces when the tool mounting portion held in sliding contact with the tool mounting rotation arm is rotated; an inflow path formed in the tool mounting rotation arm, communicating with the rotational flow path in the tool mounting rotation arm and adapted to supply inflow gas to the rotational flow path; and a discharge path formed in the tool mounting rotation arm, communicating with the rotational flow path in the tool mounting portion and adapted to discharge the gas.

According to the above construction, by supplying the gas from the interior of the tool mounting rotation arm to the tool mounting portion through the sliding surfaces of the tool mounting rotation arm and the tool mounting portion, the need for a pipe or the like is eliminated and gas can be supplied without twisting or entanglement of the pipe. Thus, gas can be stably supplied to the tool mounting portion.

The industrial robot according to the present invention may further include a swing shaft; an intermediate power transmission shaft; and an inner shaft pipe to be mounted as a part of the flow path at an inner peripheral side of the swing shaft via a bearing.

According to the above construction, by providing the inner shaft pipe at the inner peripheral side of the swing shaft via the bearing, air can be supplied from the swing shaft to the tool mounting rotation arm without providing a space around the swing shaft and, hence, an area around the swing shaft can be made smaller. Further, by being supported at an inner peripheral side of the intermediate power transmission shaft by an inner shaft pipe bearing portion, the inner shaft pipe can be reliably positioned on the swing shaft. Thus, reproducibility of the mount position of the inner shaft pipe is improved, wherefore assemblability and maintainability of the gas pipe can be improved.

In the industrial robot of the present invention, the swing arm (150) may include a swing arm main body (15) which is open at a side toward one end of the swing shaft (155b) and a swing arm cover (152) for covering an opening of the swing shaft main body; the tool mounting rotation arm (160) may include a tool mounting rotation arm main body (161) which is open at a side toward the other end of the swing shaft (155b) and a tool mounting rotation arm cover (164) for covering an opening of the tool mounting rotation arm main body (161) at the side toward the other end of the swing shaft (155b); the swing arm cover (152) may include a swing arm cover bearing portion (231b) and a swing arm cover flow path (L11) provided at a side of the swing arm cover toward the one end of the swing shaft (155b); one end of the swing arm cover flow path (L11) may communicate with an introduction pipe (210) extending from the robot base (110) to the swing arm (150) and the other end thereof may communicate with the swing arm cover bearing portion (231b); the tool mounting rotation arm cover (164) may include a tool mounting rotation arm cover bearing portion (164a) and a tool mounting rotation arm cover flow path (164b) provided at a side toward the other end of the swing shaft (155b); one end of the tool mounting rotation arm cover flow path (164b) may communicate with the tool mounting rotation arm cover bearing portion (164a) and the other end thereof may communicate with a tool mounting rotation arm inner pipe (250); and one end of the inner shaft pipe (240) may be inserted into the swing arm cover bearing portion (231b) and the other end thereof may be inserted into the tool mounting rotation arm cover bearing portion (164a).

According to the above construction, by inserting the inner shaft pipe into the swing arm cover bearing portion and the tool mounting rotation arm cover bearing portion to supply gas from the swing arm to the tool mounting rotation arm, a width in a direction of the swing shaft can be reduced, wherefore adaptability to a narrow place can be improved.

Further, the tool mounting rotation arm (160) may include a tool mounting/rotating portion (162) rotatably engaged with the tool mounting portion (170); and the rotational flow path (L1) may be formed by a tool mounting/rotating portion side groove portion (162a) formed over the entire circumference of the inner periphery of the tool mounting/rotating portion (162) and a tool mounting portion side groove portion (172) formed over the entire circumference of the outer periphery of the tool mounting portion (170) and facing the tool mounting/rotating portion side groove portion (162a) at the sliding surfaces.

According to the above construction, by supplying gas from the interior of the tool mounting rotation arm to the tool mounting portion through the tool mounting rotation arm side groove portion formed over the entire circumference of the sliding surfaces of the tool mounting rotation arm and the tool mounting portion and the tool mounting portion side groove portion formed at a position facing the tool mounting/rotating portion side groove portion, the need for a pipe or the like is eliminated and the gas can be supplied without twisting or entanglement of the pipe. Therefore, the gas can be stably supplied to the tool mounting portion.

This application is based on Japanese Patent Application Serial No. 2010-093152 filed with Japan Patent Office on Apr. 14, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An industrial robot, comprising:
   a tool mounting portion to which a tool is to be mounted;
   a tool mounting rotation arm for rotatably supporting the tool mounting portion;
   a swing arm for swingably supporting the tool mounting rotation arm via a swing shaft;
   a shoulder for rotatably supporting the swing arm via a swing arm rotating shaft;
   a lower arm for rotatably supporting the shoulder via an upper arm rotating shaft;
   a rotation frame for rotatably supporting the lower arm via a lower arm rotating shaft;
   a tube arranged along the lower arm from the rotation frame to the shoulder; and
   a robot base for rotatably supporting the rotation frame via a rotation frame rotating shaft;
   wherein the tool mounting rotation arm includes a tool mounting rotating portion in a cylindrical shape, the tool mounting portion being rotatably engaged with a inner periphery of the tool mounting rotating portion,
   wherein a flow path for supplying driving gas to the tool mounting portion is arranged from the robot base to the tool mounting portion through the interiors of the rotation frame, the tube, the shoulder, the swing arm and the tool mounting rotation arm,
   wherein the flow path includes a rotational flow path formed along a sliding surface of the tool mounting portion against the tool mounting rotating portion when the tool mounting portion is rotated, and
   wherein the rotational flow path is formed by a tool mounting rotating portion side groove portion formed over the entire circumference of the inner periphery of the tool mounting rotating portion and a tool mounting portion side groove portion formed over the entire circumference of an outer periphery of the tool mounting portion and facing the tool mounting rotating portion side groove portion at the sliding surface.

2. An industrial robot according to claim 1, wherein the flow path includes:
   a tool mounting rotation arm inner inflow path formed in the tool mounting rotation arm, communicating with the rotational flow path in the tool mounting rotation arm and adapted to supply inflow gas to the rotational flow path, and a connection path formed in the tool mounting portion, communicating with the rotational flow path in the tool mounting portion and connected to a locking mechanism of the tool.

3. An industrial robot according to claim 2, further comprising:

an intermediate power transmission shaft provided at an inner peripheral side of the swing shaft via an intermediate power transmission shaft bearing portion and adapted to transmit a rotational drive force from the swing arm to the tool mounting rotation arm; and an inner shaft pipe mounted as a part of the flow path at an inner peripheral side of the intermediate power transmission shaft via an inner shaft pipe bearing portion.

4. An industrial robot according to claim 3, wherein:

the swing arm includes a swing arm main body which is open at a side toward one end of the swing shaft and a swing arm cover for covering an opening of the swing shaft main body;

the tool mounting rotation arm includes a tool mounting rotation arm main body which is open at a side toward the other end of the swing shaft and a tool mounting rotation arm cover for covering an opening of the tool mounting rotation arm main body at the side toward the other end of the swing shaft;

the swing arm cover includes a swing arm cover bearing portion and a swing arm cover flow path provided at a side of the swing arm cover toward the one end of the swing shaft;

one end of the swing arm cover flow path communicates with an introduction pipe extending from the robot base to the swing arm and the other end thereof communicates with the swing arm cover bearing portion;

the tool mounting rotation arm cover includes a tool mounting rotation arm cover bearing portion and a tool mounting rotation arm cover flow path provided at a side toward the other end of the swing shaft;

one end of the tool mounting rotation arm cover flow path communicates with the tool mounting rotation arm cover bearing portion and the other end thereof communicates with a tool mounting rotation arm inner pipe; and one end of the inner shaft pipe is inserted into the swing arm cover bearing portion and the other end thereof is inserted into the tool mounting rotation arm cover bearing portion.

* * * * *